G. B. WAITE.
WHEEL TIRE.
APPLICATION FILED JULY 15, 1916.
1,275,634.
Patented Aug. 13, 1918.
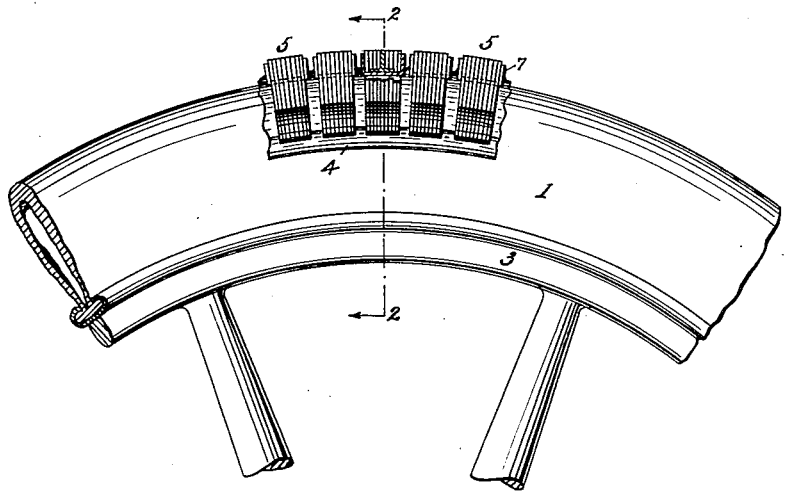
Fig. 1.
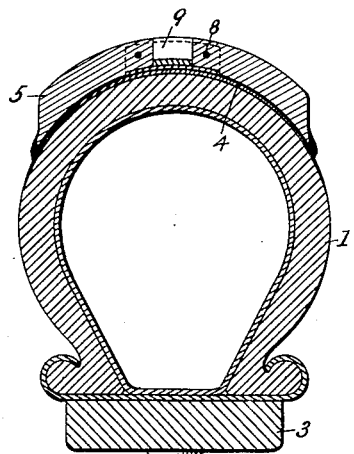
Fig. 2.
Fig. 3.
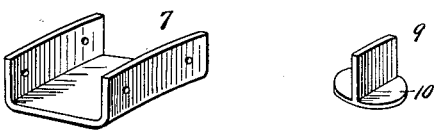
Fig. 4.
Fig. 5.
Inventor
Guy B. Waite
By Attorney
Wm Bodge

UNITED STATES PATENT OFFICE.

GUY B. WAITE, OF NEW YORK, N. Y.

WHEEL-TIRE.

1,275,634.  Specification of Letters Patent.  Patented Aug. 13, 1918.

Application filed July 15, 1916. Serial No. 109,487.

*To all whom it may concern:*

Be it known that I, GUY B. WAITE, a citizen of the United States, and resident of New York, in the county of New York and State of New York, have invented certain new and useful Improvements in Wheel-Tires, of which the following is a specification.

The invention relates to wheel-tires, and has particular reference to the shoe or tread portion of a pneumatic tire.

The object of the invention is to provide a non-puncturable tire having a plurality of transversely-spaced tread members, affording a great degree of wear-resisting and traction power, designed to avoid the common skidding action, and to preserve the natural resilience thereof.

A further object is to provide means for supporting the tread members upon the tire, either as a part of the original tire-construction, or as a recover for the ordinary smooth tire, or as a repair portion to any section thereof.

And the invention also includes certain details of construction hereinafter set forth.

In describing the invention in detail, reference is had to the accompanying drawings, forming a part of this specification, and wherein like characters of reference are used to designate corresponding parts throughout the several views, and in which:

Figure 1 is a side view of a portion of a wheel-tire embodied in the present invention, one of the tread members thereof being shown partially in cross section; Fig. 2 is an enlarged transverse section of the tire taken on the broken line 2—2, Fig. 1; Fig. 3, an enlarged detail perspective view of one of the tread members; Fig. 4, a detail view of the channel retainer for the tread members; and Fig. 5 is a detail view of a wear plate therefor.

In the drawings numeral 1 designates the shoe of an ordinary pneumatic tire, secured in well-known manner to the wheel-felly 3. Extending circumferentially around the shoe or tire is a flexible outer cover section 4, composed of fabric or rubber, or a combination of both, connected in ordinary manner, as by vulcanization or cementation, to the surface of the tire.

Upon the cover section are a plurality of transverse tread members 5, which are designed to extend completely around the circumference of the tire and to be permanently fixed thereon by cementation or vulcanization. The tread members are each composed of a plurality of vertically disposed strips of fabric 6, interposed and joined together by strips of rubber in the usual manner. Inclosing each of the tread members on the bottom and opposite sides, for the vertical and side support thereof, is a metal channel retainer 7, secured in position by the rivets 8 and by the vulcanizing means employed for uniting the tread members and cover section together. Extending vertically through the tread members is a wear-plate 9, provided with laterally-extending base flanges 10, arranged to seat upon the bottom wall of the retainer and to extend under the tread members and be held thereby. As thus positioned and supported, the wear-plates are adapted to receive a large part of the working thrust of the tire and resist the wear thereon.

In uniting the tread members to the cover section, the joint material is carried sufficiently high between and around the members to insure a fixed connection without materially reducing the elasticity of the tire, the members being spaced apart the required amount for maintaining a natural resilience and at the same time securing a substantially puncture-proof tire.

As thus constructed, it will be obvious that the cover section and thrust members thereon may form part of the original tire construction, or the same may be applied to a finished tire or further used for repair purposes.

While I have shown the preferred arrangement of the parts as including the channel retainer, it will be evident that the latter may in some cases be omitted by carrying the cementing material sufficiently high between the tread members and increasing the width of the base flanges of the wear-plates to resist the thrust thereon.

What I claim as my invention and desire to secure by Letters Patent, is:

1. In a shoe for a pneumatic tire, a flexible outer cover section connected to the shoe, a plurality of transverse tread members cemented to said cover section, channel retainers inclosing said tread members for side and vertical support, and wear-plates extending vertically through said tread members and seated upon the bottom wall of said retainers.

2. A tread member consisting of a plurality of vertically-disposed fabric strips cemented together, a channel retainer inclosing said tread member for side and vertical support, and a wear-plate extending vertically through said tread member and seated upon the bottom wall of said retainer.

3. In combination, a flexible cover section, a plurality of transverse tread members cemented to said cover section, and wear-plates extending vertically through said tread members and provided with laterally projecting base flanges extending under said members.

4. In combination, a flexible cover section, a plurality of transverse tread members secured to said cover section, each of said tread members consisting of a plurality of fabric strips disposed to present an edgewise traction surface, channel retainers inclosing said tread members for side and vertical support, and wear-plates extending through said tread members and seated upon the bottom wall of said retainers.

5. A tread member comprising a plurality of fabric strips disposed to present an edgewise traction surface, means for laterally securing said strips together, and a wear-plate extending through said tread member and provided with a laterally projecting base flange extending under said member.

Signed at New York in the county of New York and State of New York this 14th day of July A. D. 1916.

GUY B. WAITE.